United States Patent
Zhan

(10) Patent No.: US 6,188,947 B1
(45) Date of Patent: Feb. 13, 2001

(54) CLOSED LOOP SPEED CONTROL OF ABS PUMP MOTOR UTILIZING VARIABLE DUTY CYCLE AND FREQUENCY

(75) Inventor: Wei Zhan, Farmington Hills, MI (US)

(73) Assignee: Kelsey-Hayes Company, Livonia, MI (US)

(*) Notice: Under 35 U.S.C. 154(b), the term of this patent shall be extended for 0 days.

(21) Appl. No.: 09/435,651

(22) Filed: Nov. 8, 1999

Related U.S. Application Data

(60) Provisional application No. 60/107,615, filed on Nov. 9, 1998.

(51) Int. Cl.[7] .................................................. H02P 1/00
(52) U.S. Cl. .................. 701/71; 701/71; 364/426.03; 364/426.04; 303/11; 303/113.4; 303/115.2; 303/122
(58) Field of Search ........................ 701/71; 364/565, 364/426.04, 426.03; 318/280; 303/11, 115.4

(56) References Cited

U.S. PATENT DOCUMENTS

| | | | |
|---|---|---|---|
| 4,893,067 | | 1/1990 | Bhagwat et al. .................. 388/817 |
| 5,152,585 | * | 10/1992 | Patient et al. ........................ 303/10 |
| 5,179,526 | * | 1/1993 | Zimmer et al. .................... 364/565 |
| 5,188,440 | | 2/1993 | Muller et al. .................... 303/116.2 |
| 5,310,251 | * | 5/1994 | Towers et al. ........................ 303/11 |
| 5,404,304 | * | 4/1995 | Wise et al. .................... 364/426.04 |
| 5,410,229 | | 4/1995 | Sebastian et al. .................. 318/434 |
| 5,416,708 | * | 5/1995 | Matsuto et al. ................ 364/426.02 |
| 5,454,632 | * | 10/1995 | Burgdorf et al. ................ 303/115.4 |
| 5,487,593 | | 1/1996 | Potts et al. ............................ 303/11 |
| 5,504,680 | * | 4/1996 | Yamashita .................... 364/426.03 |
| 5,547,265 | * | 8/1996 | Harris et al. ........................ 303/10 |
| 5,670,852 | * | 9/1997 | Chipperfield et al. ............. 318/280 |
| 5,704,766 | * | 1/1998 | Fennel et al. ........................ 417/42 |
| 5,775,783 | * | 7/1998 | Byon .............................. 303/122.08 |
| 5,784,883 | * | 7/1998 | Ohkura et al. ........................ 60/327 |
| 5,788,341 | * | 8/1998 | Benrod et al. .................... 303/115.2 |
| 5,791,745 | * | 8/1998 | Sakakibara ............................ 303/11 |
| 5,811,947 | | 9/1998 | Hurst et al. ........................ 318/370 |
| 5,887,954 | * | 3/1999 | Steiner et al. .................... 303/113.4 |

* cited by examiner

Primary Examiner—William A. Cuchlinski, Jr.
Assistant Examiner—Tuan To
(74) Attorney, Agent, or Firm—MacMillan, Sobanski & Todd, LLC

(57) ABSTRACT

The speed of a pump motor in a vehicle brake control system is controlled by comparing an actual pump motor speed to a threshold speed. The actual pump motor speed is determined by measuring the pump back emf while the motor is de-energized. If the actual pump motor speed is greater than the threshold speed, the motor remains de-energized. If the actual pump motor speed is less than the threshold speed, the pump motor is energized with a pulse width modulated voltage having a variable duty cycle and a variable frequency which are functions of the difference between the actual pump motor speed and the threshold speed.

19 Claims, 8 Drawing Sheets

CLOSED LOOP SPEED CONTROL OF ABS PUMP MOTOR UTILIZING VARIABLE DUTY CYCLE AND FREQUENCY

CROSS REFERENCE TO RELATED APPLICATIONS

This application claims the benefit of U.S. Provisional Application Ser. No. 60/107,615, filed Nov. 9, 1998.

BACKGROUND OF THE INVENTION

This invention relates in general to vehicle antilock brake systems and in particular to a closed loop method for controlling the speed of a pump motor in an antilock brake system.

An Anti-lock Brake System (ABS) is often included as standard equipment on new vehicles. When actuated, the ABS is operative to modulate the pressure applied to some or all of the vehicle wheel brakes. A typical ABS includes a plurality of solenoid valves mounted within a control valve body and connected to the vehicle hydraulic brake system. The valve body also includes an accumulator for the temporary storage of brake fluid during an anti-lock braking cycle.

A separate hydraulic source, such as a motor driven pump, is usually included in the ABS for reapplying hydraulic pressure to the controlled wheels during an ABS braking cycle. Alternately, the pump can return brake fluid from the accumulator to the vehicle master brake cylinder during an ABS braking cycle. The pump is typically included within the control valve body with the pump motor mounted upon the exterior of the control valve body. The pump motor is usually a direct current motor which operates from the vehicle power supply. Typically, the motor runs continuously during an ABS braking cycle.

An ABS further includes an electronic control module which has a microprocessor. The microprocessor is electrically connected to the pump motor, a plurality of solenoid coils associated with the solenoid valves, and wheel speed sensors for monitoring the speed and deceleration of the controlled wheels. The assembled valve body, motor and control module form a compact unit which is often referred to as an ABS control valve.

During vehicle operation, the microprocessor in the ABS control module continuously receives speed signals from the wheel speed sensors. The microprocessor monitors the speed signals for potential wheel lock-up conditions. When the vehicle brakes are applied and the microprocessor senses an impending wheel lock-up condition, the microprocessor is operative to initiate an ABS braking cycle. During the ABS braking cycle, the microprocessor actuates the pump motor and selectively operates the solenoid valves in the control valve to cyclically relieve and reapply hydraulic pressure to the controlled wheel brakes. The hydraulic pressure applied to the controlled wheel brakes is adjusted by the operation of the solenoid valves to limit wheel slippage to a safe level while continuing to produce adequate brake torque to decelerate the vehicle as desired by the vehicle operator.

The microprocessor includes a memory portion which stores an ABS control algorithm. The ABS control algorithm comprises a set of instructions for the microprocessor which control the operation of the ABS. Typically, the instructions include a set of operational checks which are run during vehicle start up to assure that the ABS is functional. The control algorithm also includes subroutines for monitoring the vehicle operation to detect a potential lock-up of the controlled wheel brakes and for the actual operation of the ABS during an anti-lock braking cycle.

SUMMARY OF THE INVENTION

This invention relates to a closed loop method for controlling the speed of a pump motor in an antilock brake system.

An ABS is typically equipped with a Direct Current (DC) pump motor. DC motors run at a speed which is proportional to the magnitude of the applied voltage. While the voltage level in a vehicle may fluctuate, it will usually remain within a rather narrow range. Accordingly, the DC pump motor operates at a generally constant speed. During operation of the ABS, the pump motor is actuated and generates some noise during operation. Usually, the pump motor noise is masked by other vehicle sounds. However, when the vehicle operates upon a low mu road surface, the ABS can be operative to modify the ABS response to a potential brake lock-up to compensate for the low mu surface. When such a situation occurs, the demand upon the pump is reduced; however, because the pump motor operates at a generally constant speed, the sound of the pump motor may seem loud to the vehicle operator. Similarly, during the final portion of a stopping cycle, the ABS demand upon the pump is again reduced but the pump speed remains generally constant. As the vehicle slows to a stop, the pump motor sound will become more apparent and may be objectionable to the vehicle operator. Thus, it would be desirable to reduce the pump motor noise by controlling the pump motor speed.

The present invention contemplates a system for controlling at least one vehicle wheel brake that includes a pump that supplies pressurized brake fluid to the controlled wheel brake. A motor is connected to the pump for driving the pump and a control valve is connected between the pump and the controlled wheel brake. The control valve is operable to control the flow of pressurized brake fluid from the pump to the controlled wheel brake. The system also includes a sensor for measuring the speed of the pump motor and a controller electrically connected to the pump motor speed sensor and the pump motor. The controller is operative to provide power to the pump motor and to control the pump motor speed as a function of the sensed pump motor speed.

The invention further contemplates that the controller is operable after the pump motor has operated for a predetermined time period to sense the pump motor speed. The controller is further operative to de-energize the pump motor and measure a motor back emf, the controller being operative to convert the measured motor back emf into a sensed pump motor speed. The controller is also operable to determine the difference between the sensed pump motor speed and a predetermined pump motor speed threshold. When the sensed pump motor speed is greater than the pump motor speed threshold the controller maintains the pump motor in the de-energized state. However, when the sensed pump motor speed is less than the pump motor speed threshold the controller energizes the pump motor for a period of time which is a function of the difference between the sensed pump motor speed and the pump motor speed threshold.

When the controller energizes the pump motor, the controller generates a pulse width modulated voltage which is applied to the pump motor. The pulse modulated voltage has a variable duty cycle and a variable frequency which are functions of the difference between the sensed pump motor speed and the pump motor speed threshold.

The controller continues to sense the pump motor speed and to determine the difference between the sensed pump motor speed and the pump motor speed threshold. Additionally, it is contemplated that the predetermined pump motor speed threshold is one of a plurality of predetermined pump motor speed thresholds, with the controller being operative to select one of the plurality of predetermined pump motor speed thresholds for determination of the speed difference. In the preferred embodiment, the selection of a predetermined pump motor speed threshold is determined as a function of duration of a braking cycle.

The invention also contemplates a process for controlling the speed of a pump motor and associated pump for supplying pressurized brake fluid to at least one vehicle wheel brake. The pump motor is connected to a controller, which is operative to supply power to the pump motor. The controller also is connected to a speed sensor for monitoring the pump motor speed. The pump motor is operated for a predetermined time period after which the actual pump motor speed is sensed. The sensed pump motor speed is compared to a predetermined pump motor speed threshold. If the sensed pump motor speed is greater than the pump motor speed threshold the pump motor is de-energized.

The process further contemplates continuing to sense the actual pump motor speed and continuing to compare the sensed pump motor speed to the pump motor speed threshold. If the sensed pump motor speed is less than the pump motor speed threshold, the pump motor is energized by applying a pulse width modulated voltage to the pump motor. The pulse width modulated voltage has a variable duty cycle and a variable frequency which are functions of the difference between the sensed pump motor speed and the pump motor speed threshold. In the preferred embodiment, the sensing of the actual pump motor speed includes de-energizing the pump motor and measuring the pump motor back emf. The pump motor back emf is then converted to a sensed pump motor speed. Additionally, the pump motor is maintained in the de-energized state if the sensed pump motor speed is greater than the pump motor speed threshold.

It is further contemplated that the predetermined pump motor speed threshold is one of a plurality of predetermined pump motor speed thresholds, the controller being operative to select one of the plurality of predetermined pump motor speed thresholds for determination of the speed difference. The selection of pump motor speed threshold being determined as a function of duration of a braking cycle.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
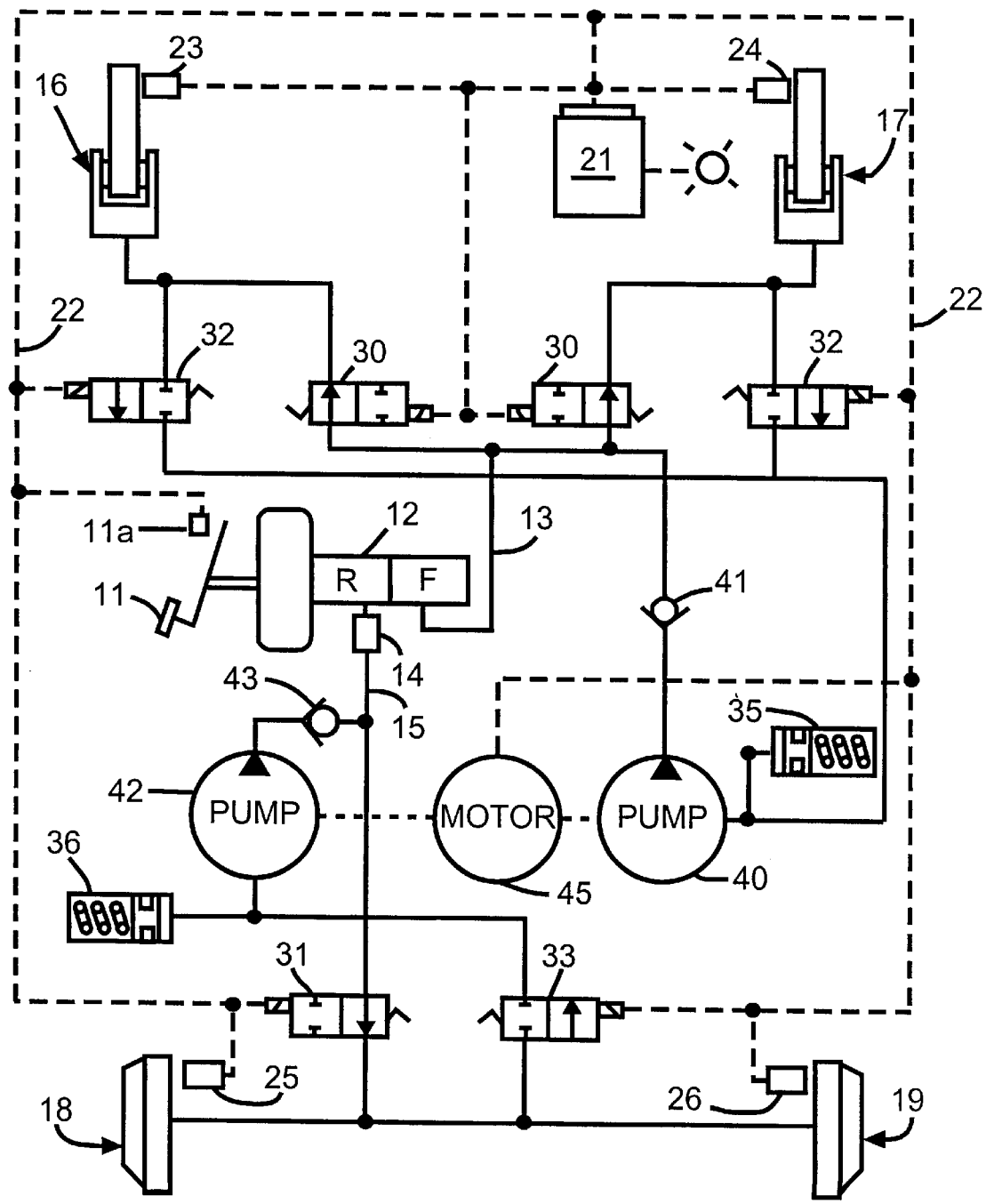
FIG. 1 is a schematic diagram of a typical prior art anti-lock brake system.

Referring now to FIG. 1, there is shown a typical four wheel ABS for use on a vehicle having a dual braking circuit split between the front and rear brakes of the vehicle. As shown in FIG. 1, the brake system includes a brake pedal 11 which operates a conventional brake light switch 11a and is connected to a dual reservoir tandem master cylinder 12. When the brake pedal 11 is depressed, the master cylinder 12 supplies hydraulic fluid under pressure to a front brake circuit through hydraulic line 13 and to a rear brake circuit through a pressure proportioning valve 14 and hydraulic line 15.

In the vertically split system shown, a separate ABS control circuit is provided for each of the front wheel brakes 16 and 17 while a single ABS control circuit is provided for both of the rear wheel brakes 18 and 19. It should be noted that, in FIG. 1, hydraulic fluid connections between components are represented by solid lines, while mechanical connections are represented by short dashed lines. For simplicity, the electrical components are shown as connected to a central electronic control module 21 by long dashed lines 22 which represent a plurality of electrical conductors. The control module 21 is connected to a plurality of speed sensors 23, 24, 25 and 26 associated with the vehicle wheels.

The ABS includes one normally open isolation valves 30 for each of the front ABS control circuits and one normally open isolation valve 31 for the rear ABS control circuit. Each of the isolation valves 30 and 31 is electrically connected to the electronic control module 21. The isolation valves 30 and 31 are closed during an ABS braking cycle to prevent further increase of the hydraulic pressure applied to a wheel brake. The isolation valves 30 and 31 can then be selectively reopened to increase the pressure. Similarly, the ABS also includes two normally closed dump valves 32 for the front ABS control circuits and one normally closed dump valve 33 for the rear ABS control circuit. The dump valves 32 and 33 are selectively opened during an ABS braking cycle to reduce the pressure applied to the wheel brakes.

The front dump valves 32 are connected to a first low pressure accumulator 35 while the rear dump valve 33 is connected to a second low pressure accumulator 36. The first low pressure accumulator 35 also is connected to an inlet port of a first pump 40. The first pump 40 has an outlet port which is connected through a check valve 41 to the front ABS control circuit. Similarly, the second low pressure accumulator 36 is connected to an inlet port of a second pump 42. The second pump 42 has an outlet port which is connected through a check valve 43 to the rear ABS control circuit. Both pumps 40 and 42 are driven by a D.C. electric pump motor 45. The pump motor 45 is electrically connected to the electronic control module 21.

As described above, the electronic control module 21 continually monitors the speed of the vehicle wheels via the wheel speed sensors 23, 24, 25 and 26. Upon detecting a wheel speed departure, which is indicative of a potential wheel lock-up condition, the control module 21 closes the isolation valves 30 and 31. The control module 21 is further operative to selectively operate the dump valves 32 and 33 to correct the potential lock-up condition and actuate the pump motor 45 once some brake fluid has been drained to the low pressure accumulators 35 and 36. In the preferred embodiment, the isolation valves 30 and 31 are re-opened to cause a second wheel speed departure. Upon correction of the second wheel speed departure, the brake pressure is typically higher than the brake pressure following correction of the first wheel speed departure.

Figure 2:
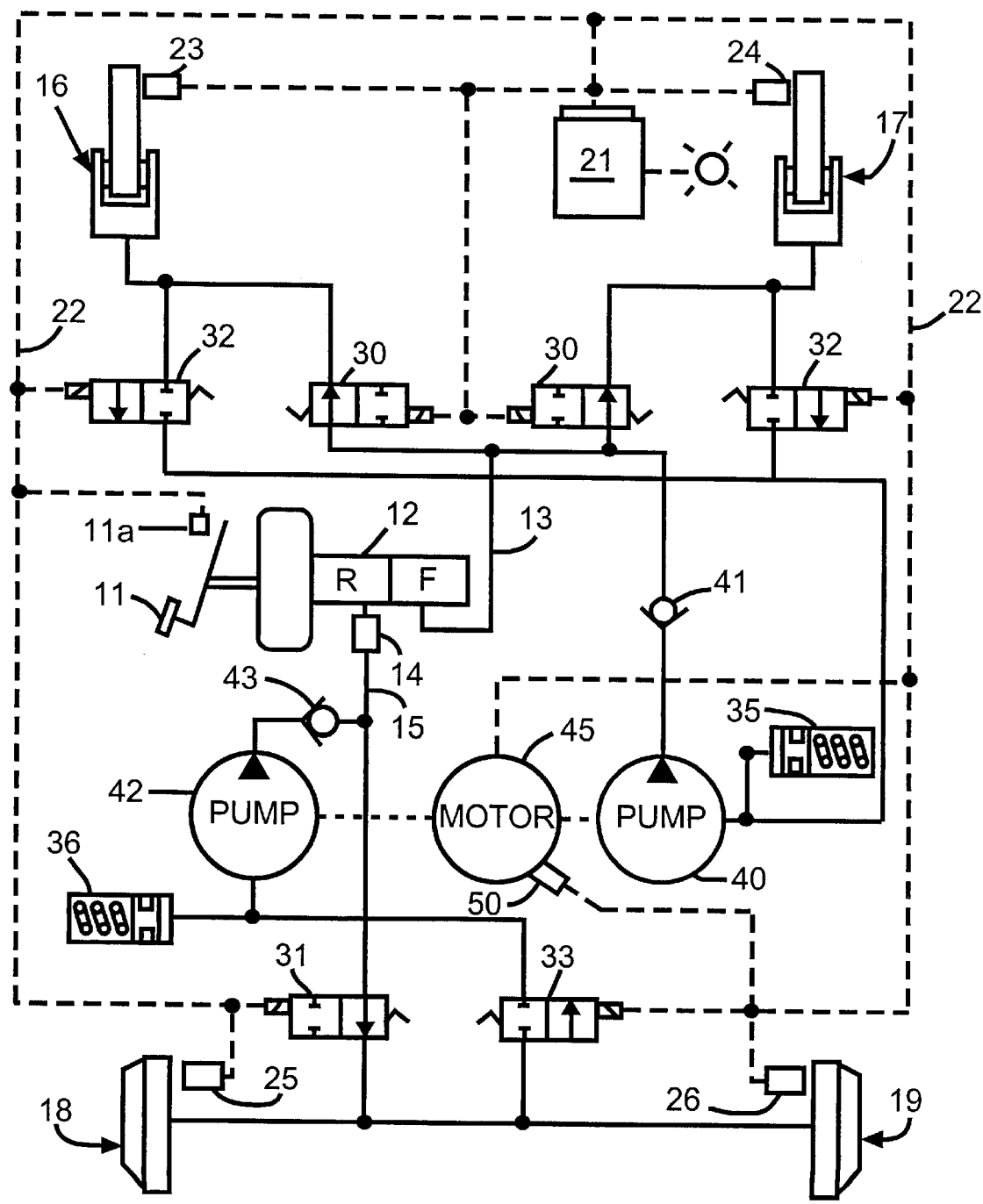
FIG. 2 is a schematic diagram of a typical anti-lock brake system in accordance with the invention.

The present invention contemplates a closed loop method for monitoring and controlling the speed of the pump motor 45 to reduce the pump motor noise. A schematic diagram for an ABS in accordance with the invention is shown in FIG. 2. Components in FIG. 2 which are the same as components shown in FIG. 1 have the same numerical designators. As shown in FIG. 2, the ABS includes a motor voltage monitor 50 for the pump motor 45 which is electrically connected the electronic control module 21. In the preferred embodiment, the motor voltage monitor 50 includes a first voltage divider (not shown) for sensing the voltage applied to the high side of the pump motor 45 by the vehicle power supply and a second voltage divider (not shown) for sensing the voltage between the low side of the pump motor 45 and ground. The voltages sensed by the voltage monitor 50 are applied to corresponding input ports of the microprocessor in the control module 21. The voltage dividers reduce the sensed voltage to a level which can be safely applied to a microprocessor port. The microprocessor subtracts the low side voltage form the high side voltage to obtain the pump motor back emf.

Alternately, the motor voltage monitor 50 can sense the voltage appearing across the brushes of the pump motor 45. In the alternate embodiment, the monitor 50 includes a conventional signal conditioning circuit (not shown) which converts the analog motor brush voltage to a digital signal which is supplied directly to a port on the control module microprocessor. The invention also can be practiced with the sensed analog back emf supplied directly to the control module 21. It will be appreciated that, in the following discussion, that a reference to "sensing the back emf of the pump motor" can refer to any of the above described methods of measuring the pump motor back emf, or any other conventional method for sensing the back emf.

The present invention contemplates that the control module 21 generates a Pulse Width Modulated (PWM) voltage which is used to control the voltage applied to he pump motor 45. During the portion of the PWM wave-shape that the motor voltage is "off", the motor back emf will be measured by the voltage monitor 50. The back emf is directly proportional to the motor speed. As will be explained below, the microprocessor in the control module 21 is responsive to the pump motor back emf to adjust both the duty cycle and the frequency of the pump motor voltage to provide an optimum motor speed.

Figure 3:
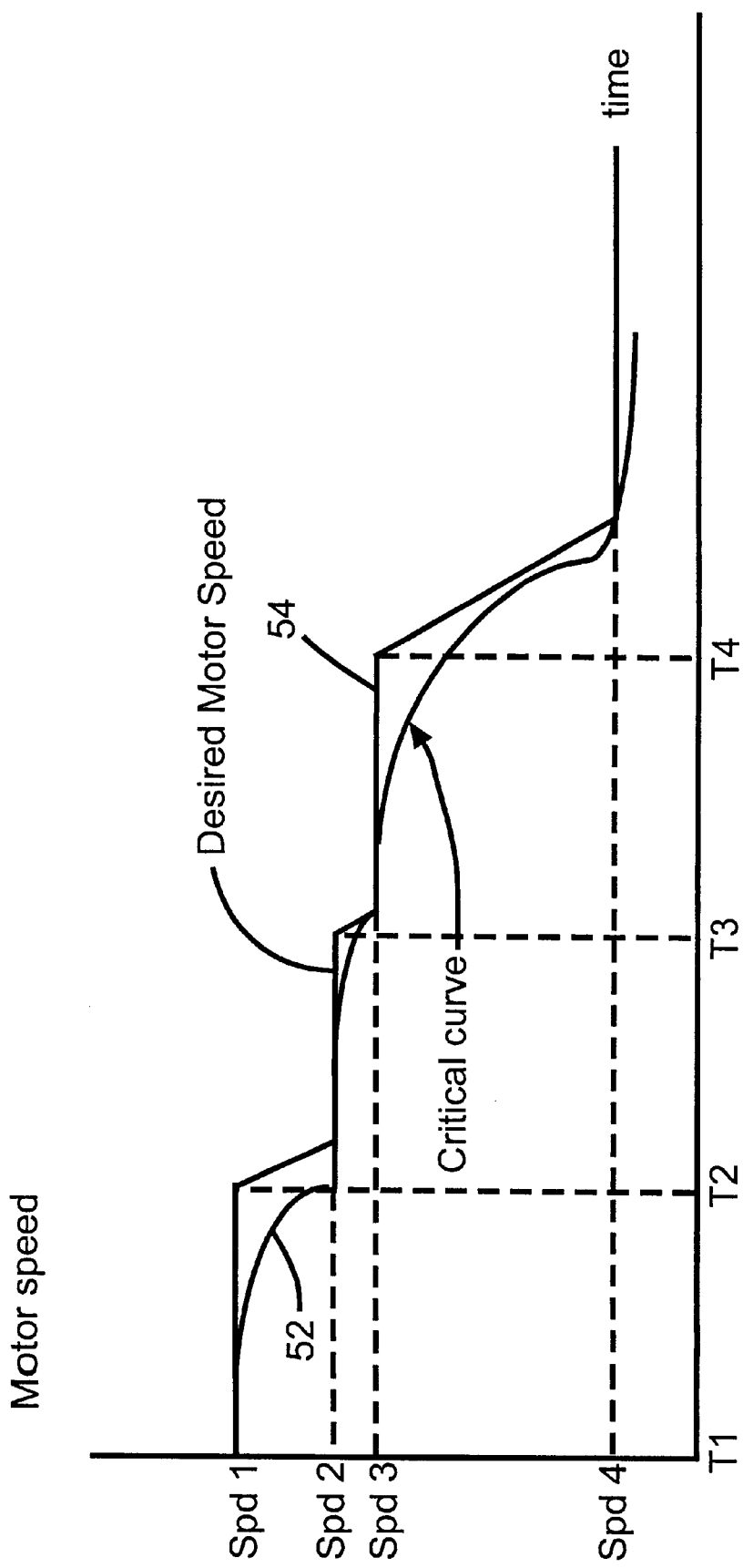
FIG. 3 is a speed curve for the pump motor included in the brake system shown in FIG. 2.

For a specific road surface condition, there exists a critical motor speed vs. time curve, as illustrated by the curve labeled 52 in FIG. 3. The critical motor speed curve is determined for specific vehicle platforms by testing and adjusting trimmable parameters in the control module 21. When the pump motor speed is above the critical curve 52, the ABS hydraulic demand will always be satisfied. If the pump motor speed falls below the critical curve 52, there is a possibility that the low pressure accumulators 35 and 36 will be filled, which would preclude any further reduction of the hydraulic pressure applied to the wheel brakes 16, 17, 18 and 19. Consequently, it is desirable that the pump motor speed is adjusted so that it is maintained above the critical motor speed curve 52. It also is desirable to keep the pump motor speed as low as possible to minimize Noise, Vibration and Harshness (NVH). Additionally, since the outlet ports of the pumps 40 and 42 are directly connected to the master cylinder 12, any changes in pump motor speed should occur gradually, since a sudden change in motor speed will cause a corresponding large displacement of the brake pedal 11.

Accordingly, the present invention contemplates a multiple speed control with the critical motor speed being reduced during the duration of an ABS cycle to allow for adjustment of the pump motor speed. An example of a four step desired motor speed curve which corresponds to the critical speed curve 52 is labeled 54 in FIG. 3. The desired motor speed 54 is initially set at a first target speed, spd1, at time T1 and subsequently reduced at transition times T2, T3 and T4 to target speeds spd2, spd3, and spd4, respectively. In the preferred embodiment, the target speed is gradually reduced over a period of time to allow a corresponding gradual adjustment of the pump motor speed. As will be explained below, in the preferred embodiment, the transition times are predetermined for the duration of the ABS cycle; however, other methods for establishing the transition times may be used. As can be seen in FIG. 3, the four step desired speed curve 54 closely approximates the critical speed curve 52.

Upon initial actuation of the ABS, the pump motor 45 runs continuously without any PWM of the motor voltage for an predetermined initial time period, T1. In the preferred embodiment, T1 is approximately 0.3 seconds; however, it will be appreciated that the length of T1 can vary with different pump motors and vehicle platforms. The initial time period T1 protects the motor control FET's from being damaged by the large motor inrush current. At time T1, the pump motor 45 is turned off for one iteration of the ABS control algorithm to allow measurement of the motor speed by sensing the motor back emf with the voltage monitor 50. In the preferred embodiment, the duration of one iteration is five msec.

The back emf is converted to an actual pump motor speed. The actual speed is subtracted from a target motor speed. If the actual motor speed is above the target speed, the pump motor remains off for subsequent iterations during which the back emf is monitored. With the motor switched off, the actual motor speed will decrease. Upon the actual motor speed falling below the target speed, proportional control is used to bring the pump motor 45 up to or slightly above the target speed. Specifically, the increase in motor speed is a function of the number of iterations that the motor 45 is on. Accordingly, the number of motor-on iterations is selected based upon the difference between the actual pump motor speed and the target motor speed. However, the maximum number of motor-on iterations is limited, since the motor 45 must be switched off periodically to allow measurement of the back emf. Periodic measurement of the motor speed is needed since sudden changes of voltage, as can occur during transients in vehicle electrical systems, sudden changes in the master cylinder pressure, or if one or both of the low pressure accumulators 35 and 36 are empty, can cause large swings in the pump motor speed. Accordingly, in the preferred embodiment, the maximum on time for the motor 45, after the initial start-up period T1 has elapsed, is limited to nine iterations, which caps the duty cycle for the pump motor voltage at 90 percent. It will be appreciated; however, that the invention also can be practiced using other maximum motor-on iterations.

Figure 4:
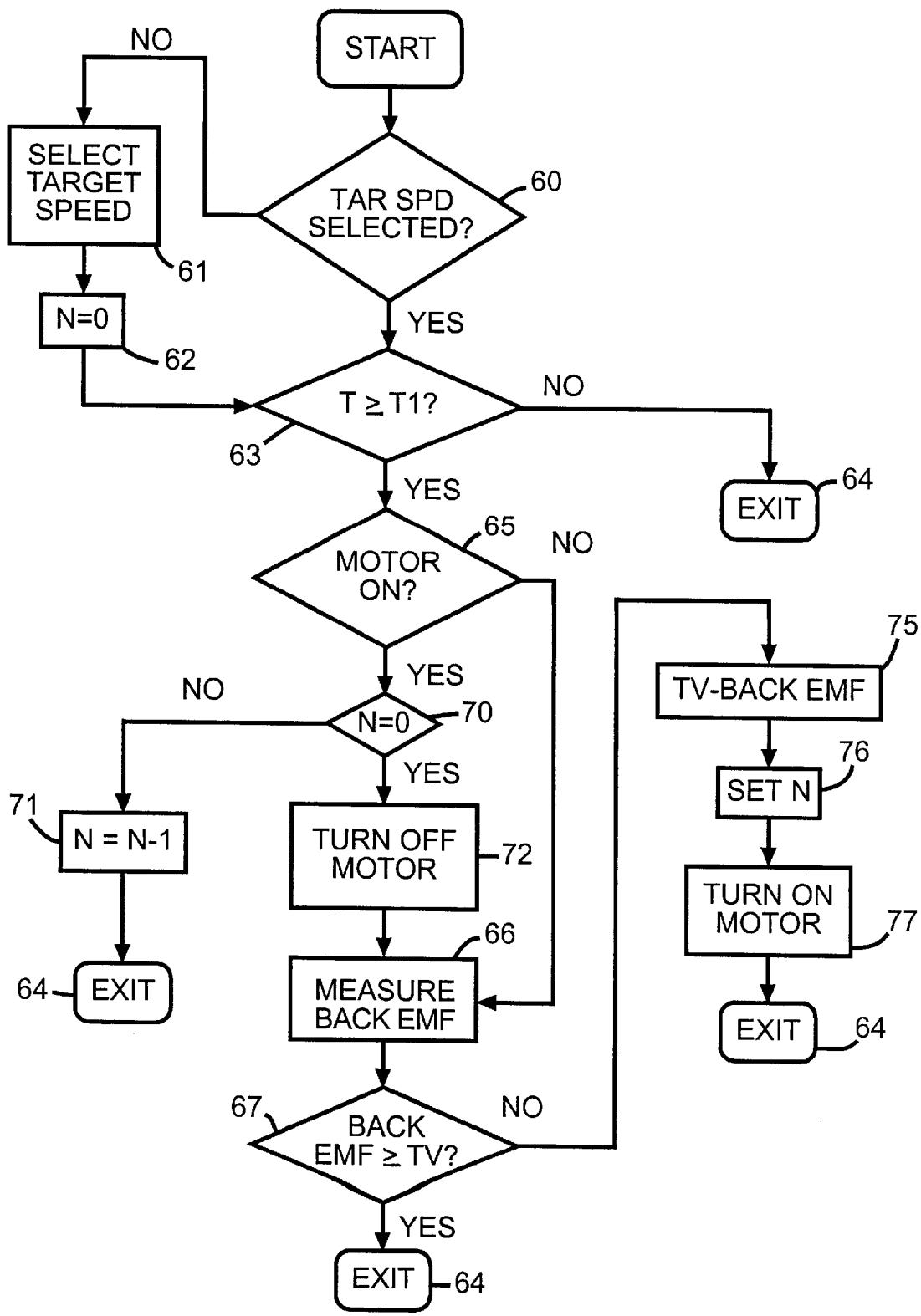
FIG. 4 is a flow chart for a closed loop pump motor speed control algorithm for the brake system shown in FIG. 2.

A flowchart shown in FIG. 4 illustrates a motor speed control algorithm which includes the overall control concept of the present invention. The flowchart is meant to be exemplary and it will be appreciated that the pump motor speed control can be implemented otherwise than shown. The speed control algorithm shown in FIG. 4 is assumed to be a subroutine in the main ABS control algorithm. Accordingly, the speed control algorithm is run during each iteration of the main ABS control algorithm. In FIG. 4, it is assumed that an ABS cycle has been initiated and the pump motor 45 started.

Upon entry into the speed control algorithm, a check is made in decision block 60 to determine if a TARget SPeeD has been selected. The selection of a TARget SPeeD is described below. If a TARget SPeeD has not been selected, the algorithm transfers to functional block 61 where a TARget SPeeD is selected. As described above, the TARget SPeeD is a function of the duration of the ABS cycle. An iteration counter, N, which is the number of motor-on iterations, is set to zero in functional block 62, after which the algorithm transfers to decision block 63.

If the target speed has been selected, the algorithm transfers directly to decision block 63, where a timer T is compared to the initial start-up period T1. If the initial start-up period has not elapsed, the algorithm exits to the main ABS control algorithm through block 64. If the initial time period T1 has elapsed, the speed control algorithm proceeds to decision block 65 to check if the pump motor 45 is running. If the pump motor 45 is not running, the algorithm transfers to functional block 66 where the motor back emf is measured. The algorithm then proceeds to decision block 67 where the motor back emf is compared to a target speed, TV. In functional block 67, the back emf is either converted to a motor speed, or a voltage which corresponds to the target speed TV is used in the comparison. If the motor speed is greater than or equal to the target speed TV, the algorithm exits through block 64 to the main ABS control algorithm.

If, in decision block 65, it is determined that the pump motor 45 is actually on, the speed control algorithm transfers to decision block 70 where the iteration counter N is compared to zero. If the iteration counter is non-zero, the algorithm transfers to functional block 71 where the iteration counter is decremented by one. The algorithm then exits through block 64. If the iteration counter is zero in decision block 70, the algorithm transfers to functional block 72, where the pump motor 45 is turned off. The algorithm then continues to functional block 66 to measure the motor back emf.

If the back emf is less than the target motor speed TV in decision block 67, the pump motor 45 should be restarted and the speed control algorithm transfers to functional block 75 where the difference between the motor speed and the target speed TV is determined. The algorithm proceeds to functional block 76 where the iteration counter is set based upon the magnitude of the difference determined in functional block 75. The algorithm transfers to functional block 77 where the pump motor 45 is turned on. The algorithm then exits to the main ABS control algorithm through block 64.

Figure 5:
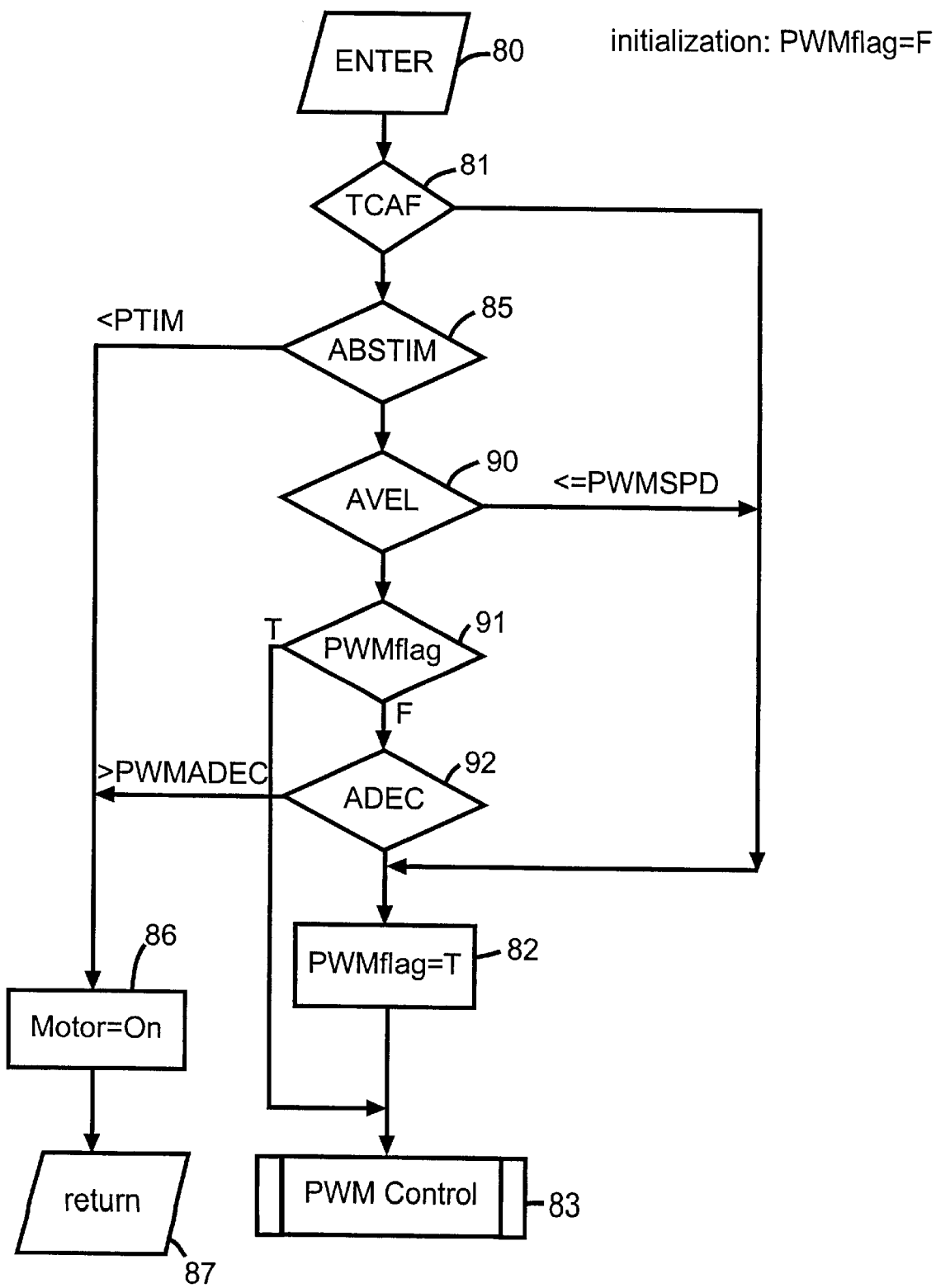
FIG. 5 is a flow chart of an ABS algorithm which includes the closed loop pump motor speed control shown in FIG. 4.
Figure 6:
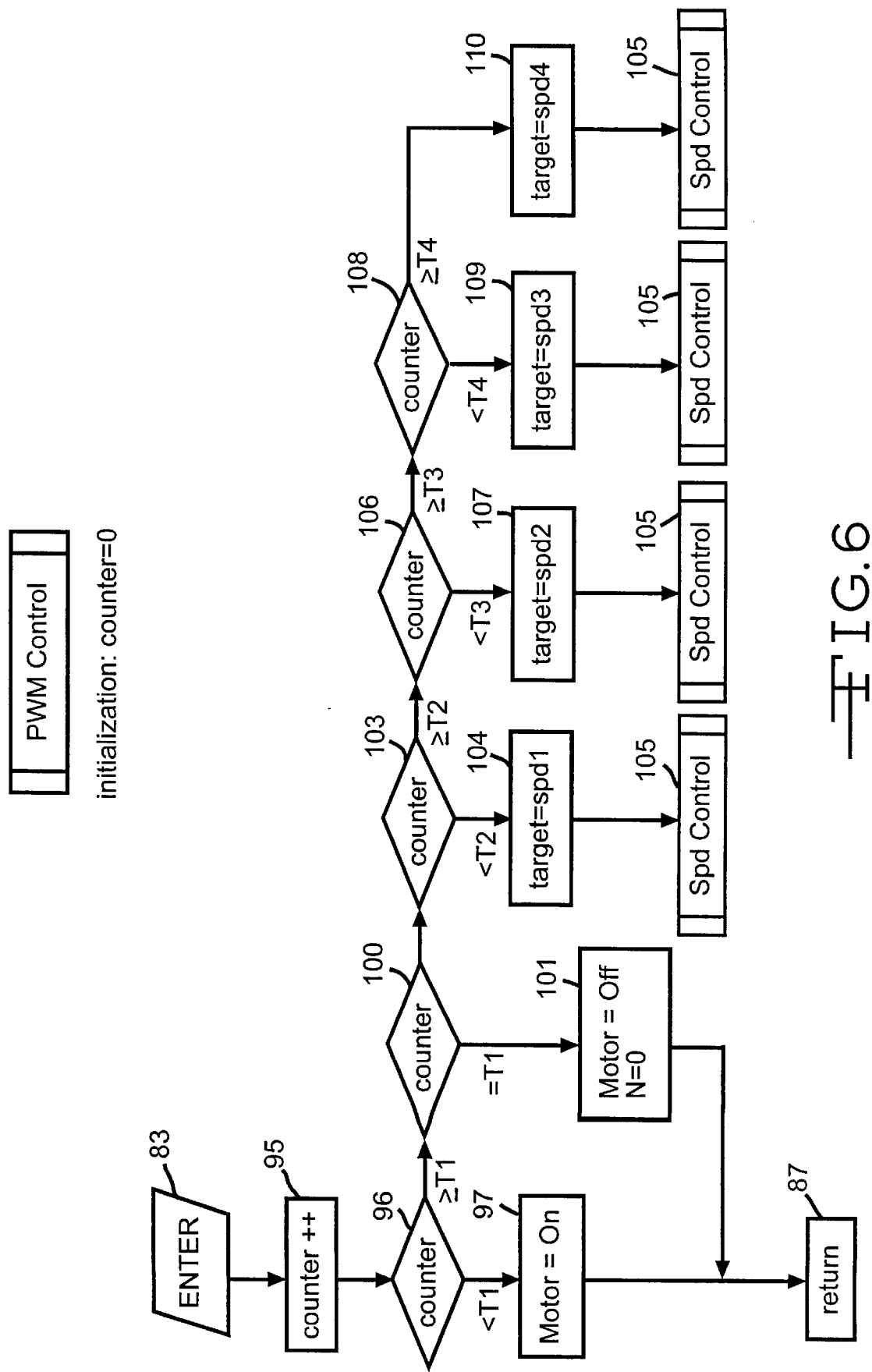
FIG. 6 is a subroutine for setting a target pump motor speed which is included in the algorithm shown in FIG. 5.
Figure 7:
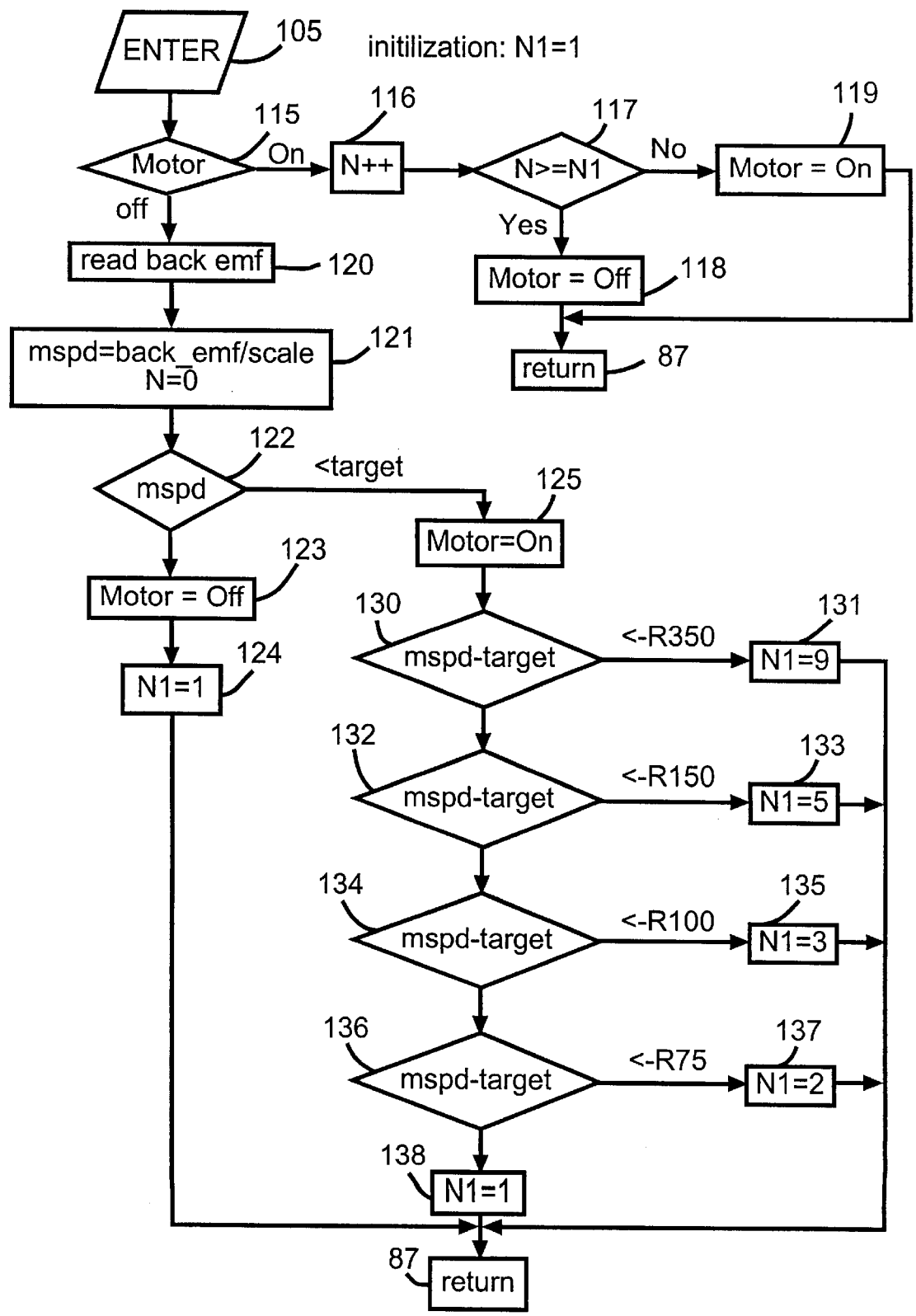
FIG. 7 is a subroutine for adjusting the pump motor speed which is included in the algorithm shown in FIG. 6.

A more detailed flow chart of the preferred embodiment of the motor speed control algorithm, which also has the speed control algorithm integrated into the main ABS control algorithm, is illustrated in FIGS. 5 through 7. As shown in FIG. 5, in the preferred embodiment, it is necessary for the average vehicle velocity and deceleration to be less than predetermined values for the pump motor speed control to be activated. The algorithm is entered at block 80. If the vehicle is equipped with traction control, the algorithm proceeds to decision block 81 where a Traction Control Active Flag is checked. If the flag is set TRUE, the traction control is active and the algorithm directly enters a pump motor speed control portion by transferring to functional block 82 where a PWM flag is set true. The algorithm then transfers to a PWM Control subroutine, which is described below and illustrated by the flow chart shown in FIG. 6. If the Traction Control Active Flag is false in decision block 81, the algorithm transfers to decision block 85. If the vehicle does not have traction control, the algorithm goes directly from the enter block 80 to decision block 85.

In decision block 85, the ABS TIMer is checked for the duration of the ABS cycle. If the timer is less than a predetermined time period, which is represented by a constant PTIM, the algorithm transfers to functional block 86 and the pump motor 45 is turned on. The algorithm then returns through block 87 to the main ABS control algorithm. If the ABS timer has reached or exceeded PTIM, the algorithm proceeds to decision block 90 where the average vehicle velocity, AVEL, is compared to a predetermined vehicle velocity threshold, PWMSPD. If the average vehicle velocity is less than PWMSPD, the motor speed control portion of the algorithm can be entered and the algorithm transfers to functional block 82 where the PWM flag is set TRUE. The algorithm then proceeds to the PWM control subroutine 83.

If the average vehicle velocity is equal to or greater than the PWM velocity threshold, the algorithm proceeds to decision block 91 to check the status of the PWM flag. If the PWM flag is true, the algorithm transfers to the PWM control subroutine 83. If the PWM flag is FALSE in decision block 91, the algorithm advances to decision block 92 where the average vehicle deceleration is compared to a predetermined deceleration threshold, PWMADEC. If the average deceleration is greater than PWMADEC, the algorithm goes to functional block 86 where the motor is turned on. The algorithm then returns through block 87 to the main ABS control algorithm. If the average vehicle deceleration is less than or equal to the deceleration threshold, PWMADEC, in decision block 92, the motor speed control portion of the algorithm can be entered and the algorithm transfers to functional block 82 where the PWM flag is set TRUE. The algorithm then proceeds to the PWM control subroutine 83.

The PWM control subroutine 83 is illustrated by the flowchart shown in FIG. 6. In functional block 95, a counter, which had been initialized at zero upon actuation of the ABS cycle, is indexed by one. The counter tracks the total elapsed time of the motor speed control cycle. The subroutine then transfers to decision block 96 where the counter is compared to the initial motor start-up time T1. If the total elapsed time is less than T1, the subroutine transfers to functional block 97 where the motor run flag is kept TRUE to maintain the pump motor 45 in operation. The subroutine then returns through block 87 to the main ABS control algorithm.

If, in decision block 96, the elapsed timer is greater than or equal to the initial time period T1, the PWM control subroutine transfers to decision block 100 where the elapsed timer is compared to the initial time period T1. If the elapsed time is equal to the initial time period T1, the subroutine transfers to functional block 101 where the motor run flag is set FALSE to cause the pump motor 45 to be turned off for a back emf measurement. The subroutine then returns through block 87 to the main ABS control algorithm.

If, in decision block 100, the elapsed time is greater than the initial time period T1, the PWM control subroutine transfers to decision block 101 where the elapsed time is compared to T2, the first point for reduction of the motor desired speed curve 54. If the elapsed time is less than T2, the first reduction point has not been reached, and the subroutine transfers to functional block 104 where the target speed is set at spd1, as illustrated in FIG. 3. The subroutine then transfers to a speed control subroutine 105, which is described below and illustrated by the flow chart shown in FIG. 7. If the elapsed time is greater than or equal to T2 in decision block 103, the subroutine transfers to decision block 106.

In decision block 106, the elapsed time is compared to T3, the second point for reduction of the desired motor speed curve 54. If the elapsed time is less than T3, the second reduction point has not been reached, and the PWM control subroutine transfers to functional block 107 where the target speed is set at spd2, as illustrated in FIG. 3. The algorithm then transfers to the speed control subroutine 105. If the elapsed time is greater than or equal to T3 in decision block 106, the subroutine transfers to decision block 108.

In decision block 108, the elapsed time is compared to T4, the third point for reduction of the desired motor speed curve 54. If the elapsed time is less than T4, the third reduction point has not been reached, and the PWM control subroutine transfers to functional block 109 where the target speed is set at spd3, as illustrated in FIG. 3. The subroutine then transfers to the speed control subroutine 105. If the elapsed time is greater than or equal to T4 in decision block 108, the subroutine transfers to functional block 110 where the target speed is set at spd4, as illustrated in FIG. 3. The subroutine then transfers to the speed control subroutine 105.

The speed control subroutine 105 is illustrated by the flow chart shown in FIG. 7. Upon initialization of the motor speed control subroutine, an iteration threshold, N1 is set to one. As shown in FIG. 7, the motor speed control subroutine first checks the motor run flag in decision block 115. If the motor run flag is TRUE, the subroutine transfers to functional block 116 where an iteration counter, N, is incremented by one. The subroutine then advances to decision block 117 where the iteration counter N is compared to the iteration threshold N1. If the counter N is greater than the iteration threshold N1, the subroutine transfers to functional block 118 where the motor run flag is set FALSE to turn the pump motor 45 off. The subroutine then returns through block 87 to the main ABS control algorithm. If the counter N is less than or equal to the iteration threshold N1 in decision block 117, the subroutine goes to functional block 119 and the motor run flag is set TRUE.

If the motor run flag is false in decision block 115, the pump motor 45 is off and the motor speed control subroutine transfers to functional block 120, where the pump motor back emf is sensed. The subroutine continues to functional block 121 where the back emf voltage is scaled to convert the sensed back emf to a motor speed. Additionally, the iteration counter N is set, or reset, to zero in functional block 121. The subroutine proceeds next to decision block 122 where the motor speed is compared to the current target speed, as determined in the PWM control subroutine 83 described above. If the motor speed is greater than or equal to the target speed, the motor speed is above the desired motor speed curve 54 shown in FIG. 3 and the subroutine transfers to functional block 123 where the motor run flag is set FALSE to turn off the pump motor 45. After setting the motor run flag, the subroutine continues to functional block 124 where the iteration threshold N1 is set to its initial value of one. The subroutine then returns through block 87 to the main ABS control algorithm.

Figure 8A:
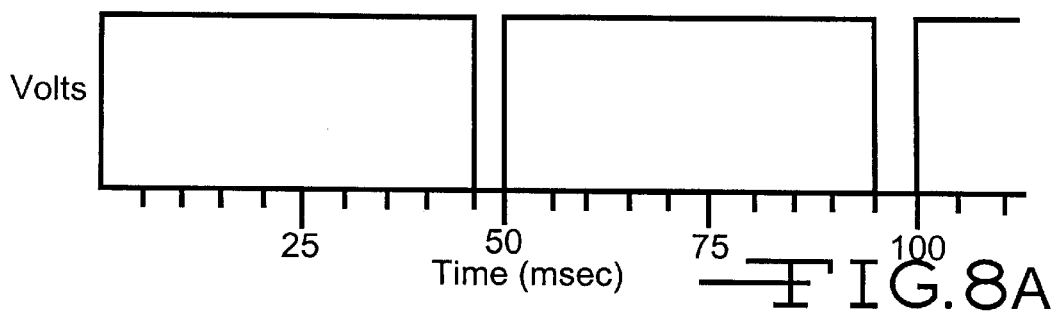
FIG. 8 illustrates pump motor voltages generated by the algorithm illustrated in FIGS. 5 through 7.

If, in decision block 122, the motor speed is less than the current target speed, the motor speed has fallen below the desired motor speed curve 54 shown in FIG. 3 and the pump motor 45 should be restarted. Accordingly, the motor speed control subroutine transfers to functional block 125 where the motor run flag is set TRUE to turn the pump motor 45 on. The subroutine then transfers to a series of decision blocks which set an iteration threshold which is a function of the amount that the actual motor speed has fallen below the desired motor speed curve 54. In the first decision block 130, the current target speed is subtracted from the motor speed to obtain a speed difference. Because the motor speed is less than the target speed, the speed difference will be negative. If the speed difference is below a first predetermined speed difference threshold, which is stored in a register, the iteration threshold N1 is set equal to nine in functional block 131, which corresponds to a PWM motor voltage having a duty cycle of 90 percent and a frequency of 20 Hz, as shown in FIG. 8A. In the preferred embodiment, the first speed difference threshold is 350 rpm; however, other values can be used for the first and other speed difference thresholds. The subroutine then returns through block 87 to the main ABS control algorithm.

Figure 8B:
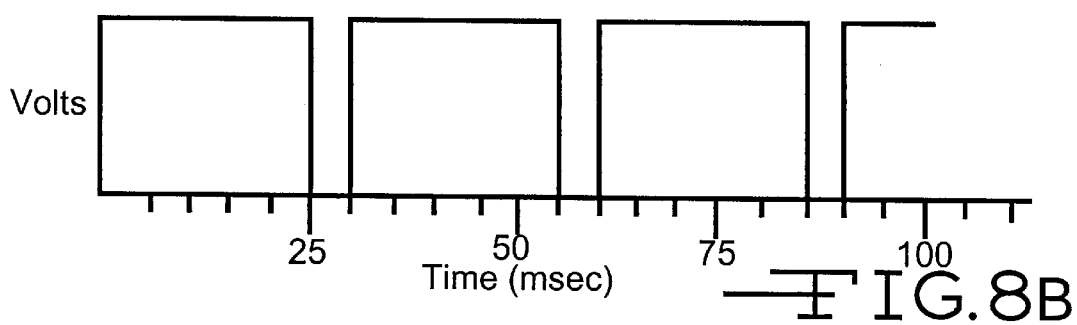

If the speed difference in decision block 130 is greater than or equal to the first speed difference threshold, the motor speed control subroutine transfers to decision block 132, where the difference between the motor speed and target speed is compared to a second speed predetermined difference threshold having a magnitude which is less than the first speed difference threshold. In the preferred embodiment, the second speed difference threshold is 150 rpm. If the speed difference is less than the second speed difference threshold, that is, the motor speed is between the first and second speed difference thresholds, the iteration threshold N1 is set equal to 5 in functional block 133, which corresponds to a PWM motor voltage having a duty cycle of 83 percent and a frequency of 33 Hz, as shown in FIG. 8B. The subroutine then returns through block 87 to the main ABS control algorithm.

Figure 8C:
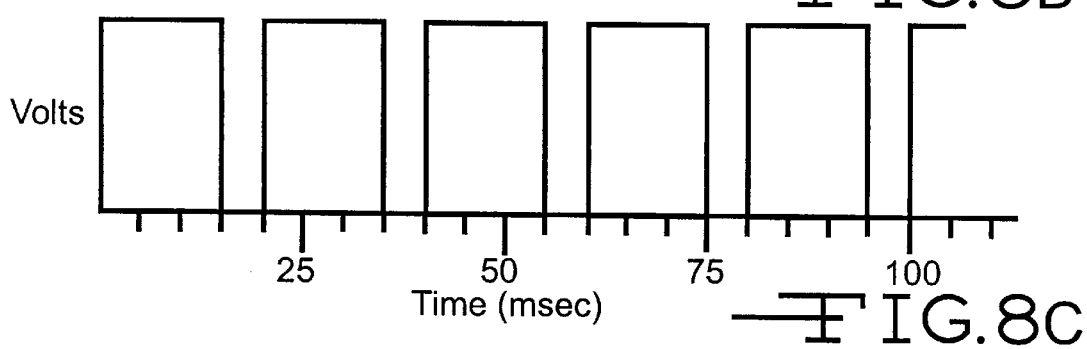

If the speed difference in decision block 132 is greater than or equal to the second speed difference threshold, the motor speed control subroutine transfers to decision block 134, where the difference between the motor speed and target speed is compared to a third predetermined speed difference threshold having a magnitude which is less than the second speed difference threshold. In the preferred embodiment, the third speed difference threshold is 100 rpm. If the speed difference is less than the third speed difference threshold, that is, the motor speed is between the second and third speed difference thresholds, the iteration threshold N1 is set equal to 3 in functional block 135, which corresponds to a PWM motor voltage having a duty cycle of 75 percent and a frequency of 50 Hz, as shown in FIG. 8C. The subroutine then returns through block 87 to the main ABS control algorithm.

Figure 8D:
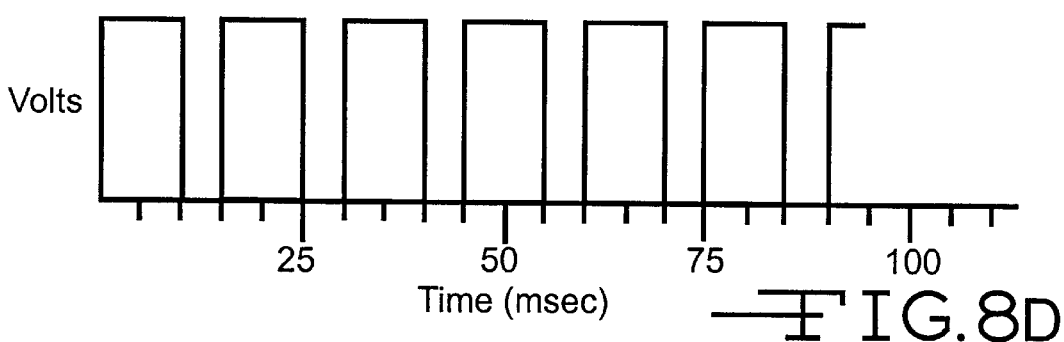
Figure 8E:
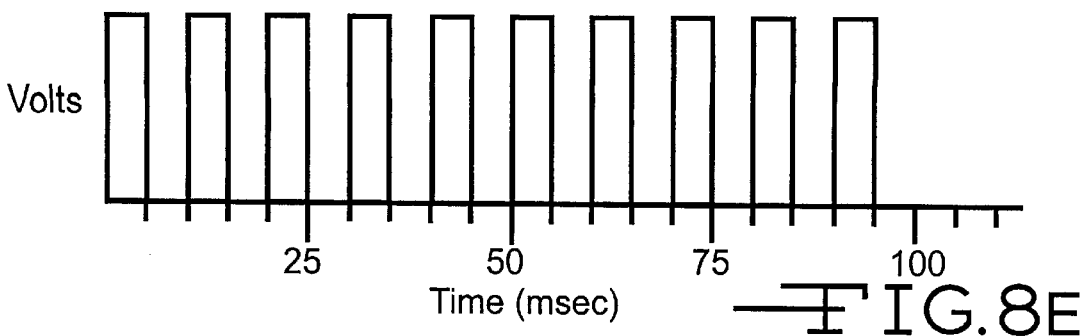

If the difference in decision block 134 is greater than or equal to the third speed difference threshold, the motor speed control subroutine transfers to decision block 136, where the difference between the motor speed and target speed is compared to a fourth predetermined speed difference threshold which has a magnitude which is less than the third speed difference threshold. In the preferred embodiment, the fourth speed difference threshold is 75 rpm. If the speed difference is less than the fourth speed difference threshold, that is, the motor speed is between the third and fourth speed difference thresholds, the iteration threshold N1 is set equal to 2 in functional block 137, which corresponds to a PWM motor voltage having a duty cycle of 67 percent and a frequency of 67 Hz, as shown in FIG. 8D. The subroutine then returns through block 87 to the main ABS control algorithm. If the speed difference in decision block 136 is greater than or equal to the fourth speed difference threshold, the subroutine transfers to functional block 138 where the iteration threshold N1 is set to one, which corresponds to a PWM motor voltage having a duty cycle of 50 percent and a frequency of 100 Hz, as shown in FIG. 8E. The subroutine then returns through block 87 to the main ABS control algorithm.

As shown in FIGS. 8A through 8E, both the duty cycle and frequency of the pump motor voltage change as a function of the difference between the actual motor speed and the desired, or target, motor speed. Thus, as the difference between the actual motor speed and the desired motor speed is reduced, the motor-on time is correspondingly reduced. It will be appreciated that the invention contemplates that the iteration threshold target speed threshold values are trimmable and can have other values than those described above and illustrated in the Figures.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the preferred embodiment of the invention has been illustrated and described for an antilock brake system, it will be appreciated that the invention also can be practiced with other systems, such as, for example, traction control and vehicle stability management.

What is claimed is:

1. A system for controlling at least one vehicle wheel brake comprising:
   a pump which supplies pressurized brake fluid to the controlled wheel brake;
   a motor connected to said pump for driving said pump;
   a control valve connected between said pump and the controlled wheel brake, said control valve operable to control the flow of pressurized brake fluid from said pump to the controlled wheel brake;
   a sensor for measuring the speed of said pump motor; and
   a controller electrically connected to said pump motor speed sensor and said pump motor, said controller operative to provide power to said pump motor and to control said pump motor speed as a function of said sensed pump motor speed by de-energizing said pump motor when said sensed pump motor speed is greater than a motor speed threshold and to maintain said pump motor in a de-energized state while said sensed pump motor speed is greater than said motor speed threshold.

2. A system according to claim 1 wherein said controller is operable after said pump motor has operated for a predetermined time period to sense said pump motor speed.

3. A system according to claim 2 wherein said controller is operative to de-energize said pump motor and measure a motor back emf, said controller further operable to convert said measured motor back emf into an actual pump motor speed.

4. A system according to claim 3 wherein said controller is further operable to determine the difference between said actual pump motor speed and a predetermined pump motor speed threshold and further wherein said controller also is operable, when said actual pump motor speed is greater than said pump motor speed threshold to maintain said pump motor in said de-energized state.

5. A system according to claim 4 wherein said controller also is operable, when said sensed pump motor speed is less than said pump motor speed threshold to energize said pump motor for a period of time which is a function of said difference between said sensed pump motor speed and said pump motor speed threshold.

6. A system according to claim 5 wherein said controller generates a pulse width modulated voltage which is applied to said pump motor, said pulse modulated voltage having a variable duty cycle and a variable frequency which are functions of said difference between said actual pump motor speed and said pump motor speed threshold.

7. A system according to claim 6 wherein said controller continues to sense said pump motor speed and to determine the difference between said actual pump motor speed and said pump motor speed threshold.

8. A system according to claim 7 wherein said predetermined pump motor speed threshold is one of a plurality of predetermined pump motor speed thresholds, said controller being operative to select one of said plurality of predetermined pump motor speed thresholds for determination of said speed difference, said selection of a predetermined pump motor speed threshold being determined as a function of duration of a braking cycle.

9. A system according to claim 8 wherein the system is included an anti-lock brake system.

10. A system according to claim 8 wherein the system is included a traction control system.

11. A system according to claim 8 wherein the system is included in a vehicle stability management system.

12. A process for controlling the speed of a pump motor comprising the steps of:
    (a) providing a pump for supplying pressurized brake fluid to at least one vehicle wheel brake, the pump being driven by a motor which is connected to a controller, the controller being operative to supply power to the pump motor, the controller also connected to a speed sensor for monitoring the pump motor speed;
    (b) operating the pump motor for a predetermined time period;
    (c) sensing the actual pump motor speed;
    (d) comparing the sensed pump motor speed to a predetermined pump motor speed threshold;
    (d) de-energizing the pump motor if the sensed pump motor speed is greater than the pump motor speed threshold
    (f) continuing to sense the actual pump motor speed; and
    (g) continuing to compare the sensed pump motor speed to the pump motor speed threshold and maintaining the pump motor in a de-energized state while the sensed pump motor speed remains greater than the pump motor speed threshold.

13. A process according to claim 12 further including, subsequent to step (g), the step of:
    (h) energizing the motor if the sensed pump motor speed is less than the pump motor speed threshold.

14. A process according to claim 13 wherein sensing the actual pump motor speed in step (c) includes:
    (c1) de-energizing the pump motor;
    (c2) measuring the pump motor back emf; and
    (c3) converting the pump motor back emf to a sensed pump motor speed;
    and further wherein step (e) includes maintaining the pump motor in the de-energized state.

15. A process according to claim 14 wherein the pump motor is energized by applying a pulse width modulated voltage thereto, the pulse width modulated voltage having a variable duty cycle and a variable frequency which are functions of the difference between the sensed pump motor speed and the pump motor speed threshold.

16. A process according to claim 15 wherein the predetermined pump motor speed threshold is one of a plurality of predetermined pump motor speed thresholds, the controller being operative to select one of the plurality of predetermined pump motor speed thresholds for determination of the speed difference, the selection of a pump motor speed threshold being determined as a function of duration of a braking cycle.

17. A process according to claim 16 wherein the pump motor is included an anti-lock brake system.

18. A system according to claim 16 wherein the pump motor is included a traction control system.

19. A system according to claim 16 wherein the system is included in a vehicle stability management system.

* * * * *